(12) United States Patent
Schliemann et al.

(10) Patent No.: US 7,698,779 B2
(45) Date of Patent: Apr. 20, 2010

(54) HAND-GUIDED PORTABLE VACUUM/BLOWER DEVICE

(75) Inventors: Harald Schliemann, Waiblingen (DE); Manfred Rabis, Schwaikheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 899 days.

(21) Appl. No.: 11/307,512

(22) Filed: Feb. 10, 2006

(65) Prior Publication Data
US 2006/0179602 A1 Aug. 17, 2006

(30) Foreign Application Priority Data
Feb. 17, 2005 (DE) .................... 10 2005 007 294

(51) Int. Cl.
*A47L 9/32* (2006.01)
*F04D 29/66* (2006.01)
*F01D 25/00* (2006.01)
*F04B 17/05* (2006.01)

(52) U.S. Cl. .................... 15/405; 15/330; 415/119; 417/234

(58) Field of Classification Search .................... 15/330, 15/344, 405; 415/119; 416/63; 417/234, 417/363, 364, 423.14, 423.2
See application file for complete search history.

(56) References Cited

U.S. PATENT DOCUMENTS

| | | | | |
|---|---|---|---|---|
| 4,318,203 A | * | 3/1982 | Satoh et al. | 15/344 |
| 4,644,606 A | * | 2/1987 | Luerken et al. | 15/330 |
| 4,674,146 A | * | 6/1987 | Tuggle et al. | 15/330 |
| D339,432 S | * | 9/1993 | Rakocy et al. | D32/15 |
| 5,269,665 A | * | 12/1993 | Sadler et al. | 417/363 |
| D359,603 S | * | 6/1995 | Rakocy et al. | D32/15 |
| RE36,107 E | * | 2/1999 | Smith et al. | 200/61.85 |
| 5,975,862 A | * | 11/1999 | Arahata et al. | 417/234 |
| 6,468,053 B2 | | 10/2002 | Wölpert | |
| 7,300,243 B2 | * | 11/2007 | Saitou et al. | 415/119 |
| 2001/0002501 A1 | | 6/2001 | Doragrip | 15/344 |

FOREIGN PATENT DOCUMENTS

GB    2297514 A    8/1996

* cited by examiner

*Primary Examiner*—David B Thomas
(74) *Attorney, Agent, or Firm*—Gudrun E. Huckett

(57) ABSTRACT

A hand-guided portable vacuum/blower device has a blower unit with a blower and a motor unit with a drive motor. The blower unit is rigidly connected to the motor unit. The drive motor is drivingly connected to the blower. A grip part is connected with antivibration elements to the motor unit and the blower unit. The grip part is at least approximately ring-shaped and has a first handle. The grip part is arranged in a plane that is positioned perpendicularly to an axis of rotation of the blower and, when viewed in the direction of the axis of rotation, is located between the motor unit and the blower unit.

21 Claims, 3 Drawing Sheets

HAND-GUIDED PORTABLE VACUUM/BLOWER DEVICE

BACKGROUND OF THE INVENTION

The invention relates to a hand-guided portable vacuum/blower device comprising a motor unit in which a drive motor is arranged and further comprising a blower unit that is essentially rigidly connected to the motor unit, wherein the blower unit has arranged therein a blower that is driven by the drive motor. A grip part is connected by means of anti-vibration elements to the motor unit and the blower unit and comprises a first handle.

Hand-guided portable vacuum/blower devices comprise a motor unit with a drive motor that drives the blower of the blower unit so that an airflow is generated. In blower mode, this airflow is directed by the operator against a ground surface to be cleaned, for example, for the purpose of gathering leaves. The leaves that are compiled in a heap are then collected and disposed of. Alternatively, a vacuum operation can be provided also; a vacuum tube is connected to the intake side of the blower through which the aforementioned airflow enters the blower. In a device position that differs from that for blower operation, the vacuum tube is directed against the ground surface to be cleaned so that the leaves or other objects are sucked in and, for example, conveyed into a collecting bag.

The possibility of different grip positions is desirable for the different operating modes in the context of excellent ergonomics. At least one appropriate handle must be provided on an appropriate grip part.

U.S. 2001/0002501 A1 discloses a portable leaf blower where the motor unit and the blower unit are connected to one another. In addition, a grip part with a handle is provided by which the leaf blower can be carried in an upright position for blower operation. Relative to the axial direction of the blower, the grip part is arranged on the end face of the blower spiral such that the handle is positioned on the axial side of the blower opposite the drive motor. In the usual upright holding position, the weight forces of the motor unit and of the blower unit have a horizontal leverage relative to the handle that makes a fatigue-free upright carrying of the leaf blower more difficult. The lateral arrangement of the grip part leads to pretensioning of the antivibration elements caused by the weight force so that the vibration-decoupling effect of the antivibration elements is restricted.

SUMMARY OF THE INVENTION

It is an object of the present invention to further develop a hand-guided portable vacuum/blower device of the aforementioned kind such that an improved handling is provided.

In accordance with the present invention, this is achieved in that the grip part has, at least approximately, a ring shape and is arranged in a plane that is perpendicular to an axis of rotation of the blower and is located, when viewed in the direction of the axis of rotation, between the motor unit and the blower unit.

In the usual upright position for blower operation, the motor unit is positioned on one side and the blower unit on the opposite side of the handle relative to the axial direction of the blower axis. The moments that are caused by the weight force and act about the handle will compensate one another at least approximately. Essentially, only vertical weight forces act on the handle so that a fatigue-free handling is facilitated. Also, the antivibration elements that are provided for attaching the grip part are subjected essentially only to vertical weight forces so that their static load is reduced. For improving the vibration-decoupling effect, the antivibration elements can be designed to be correspondingly soft without negatively affecting the guiding precision.

In an advantageous further embodiment, the first handle is arranged in the area of a first ring section of the grip part and a further handle is arranged in the area of a second ring section of the grip part which second ring section, relative to the axis of rotation, is positioned opposite to the first ring section. For vacuum operation, the device can be tilted from its upright position provided for blower operation and can be held with both hands by gripping the two handles. The axis of rotation of the blower and a vacuum tube to be connected thereto are therefore essentially vertical; this facilitates simple vacuuming of leaves or dirt. The masses of the motor unit and of the blower unit, respectively, are positioned approximately centrally between the two handles in the vacuum position so that the weight forces are distributed approximately uniformly onto both handles. In the vertical direction, corresponding to the axial direction, the center of gravity is positioned also approximately at the level of the two handles so that moments are prevented when slanting the device. The vacuum/blower device can be beneficially held and guided in an ergonomic way in any angular position.

It can be expedient to arrange the handles as additional components on the aforementioned ring sections. Advantageously, the first handle and/or the additional (second) handle are formed by the first ring section or the second ring section. The handle or handles are therefore integral components of the grip part; this enables a simple, lightweight, and highly loadable construction.

In the area of the second ring section, support legs are expediently arranged for resting the vacuum/blower device thereon. The central connection of motor unit and blower unit to the grip part leads to an excellent vibration decoupling action relative to the support legs arranged on the grip part. The vacuum/blower device can be safely put down even when the drive motor is running.

The first and/or the additional (second) handle is provided preferably with an electrically conducting, in particular, a soft, grip surface. Expediently, the electrically conducting grip surface is formed by at least one and, in particular, two oppositely arranged grip shells connected to the handle, respectively, and made of soft, grip-enhancing and electrically conducting plastic material. In addition to excellent grip, also an effective discharge of optionally occurring electrostatic charges is enabled; this relieves the operator and improves handling.

In an advantageous further embodiment, a central section of the grip part, that is positioned opposite to a discharge socket of the blower, is essentially convexly rounded in a radial direction relative to the axis of rotation in regard to its circumferential contour and in particular in regard to its cross-section. Expediently, the central section of the grip part extends in the radial direction at least to the outer contour of the motor unit and of the blower unit and, in particular, projects past them. For example, in vacuum operation with upright axis of rotation of the blower and guiding with both hands by gripping both handles, the device can be supported against the body of the operator in that the rounded central section is used as a support surface. This contributes also to a fatigue-free guiding action.

In an expedient configuration a fuel tank is attached to the ring-shaped grip part, in particular, to its central section. The fuel tank on the grip part is decoupled by means of the aforementioned antivibration elements from the vibration excitation caused by the motor unit so that foaming of the fuel and other vibration-caused disadvantages are prevented. The position of the fuel tank in the central section also assists in providing uniform weight distribution onto both handles. The arrangement of the fuel tank, of the support legs, and additional components on the grip part reduces proportionally the mass of the component module that is comprised of the blower unit and of the motor unit. The vibrating masses of this module are reduced so that the vibration level as a whole is reduced.

In a further advantageous embodiment, an operating element for the drive motor is arranged on the ring-shaped grip part in particular in the area of the first handle. The drive motor can be operated or adjusted without having to reposition the hand on the grip part in all provided operating positions wherein the operating element and the grip part are decoupled from the motor vibrations.

For an effective vibration decoupling action with simultaneous high guiding precision, an arrangement of at least three and particularly four antivibration elements has been found to be expedient. The antivibration elements are advantageously configured as coil springs that are arranged in particular axis-parallel to one another. In a preferred embodiment in which the coil springs are surrounded or enclosed by cylindrical receiving openings of the grip part, the antivibration elements are effectively protected against soiling and corrosion. As needed, the cylindrical receiving openings can also be configured as lateral supports of the coil springs, as travel limiters, or for increasing the stiffness in this direction.

In a preferred configuration, the ring-shaped grip part is essentially C-shaped wherein an open side of the C-shape is arranged in the area of the discharge socket. The C-shape enables simple mounting in that the grip part with its open side is inserted between the blower unit and the motor unit and then attached. The C-shape also provides a certain inherent elasticity of the grip part that can also contribute to additional vibration damping.

BRIEF DESCRIPTION OF THE DRAWING

FIG. 1 shows in a side view a vacuum/blower device according to the invention comprising a motor unit, a blower unit, and a C-shaped grip part positioned in between.

DESCRIPTION OF THE PREFERRED EMBODIMENTS

Figure 1:
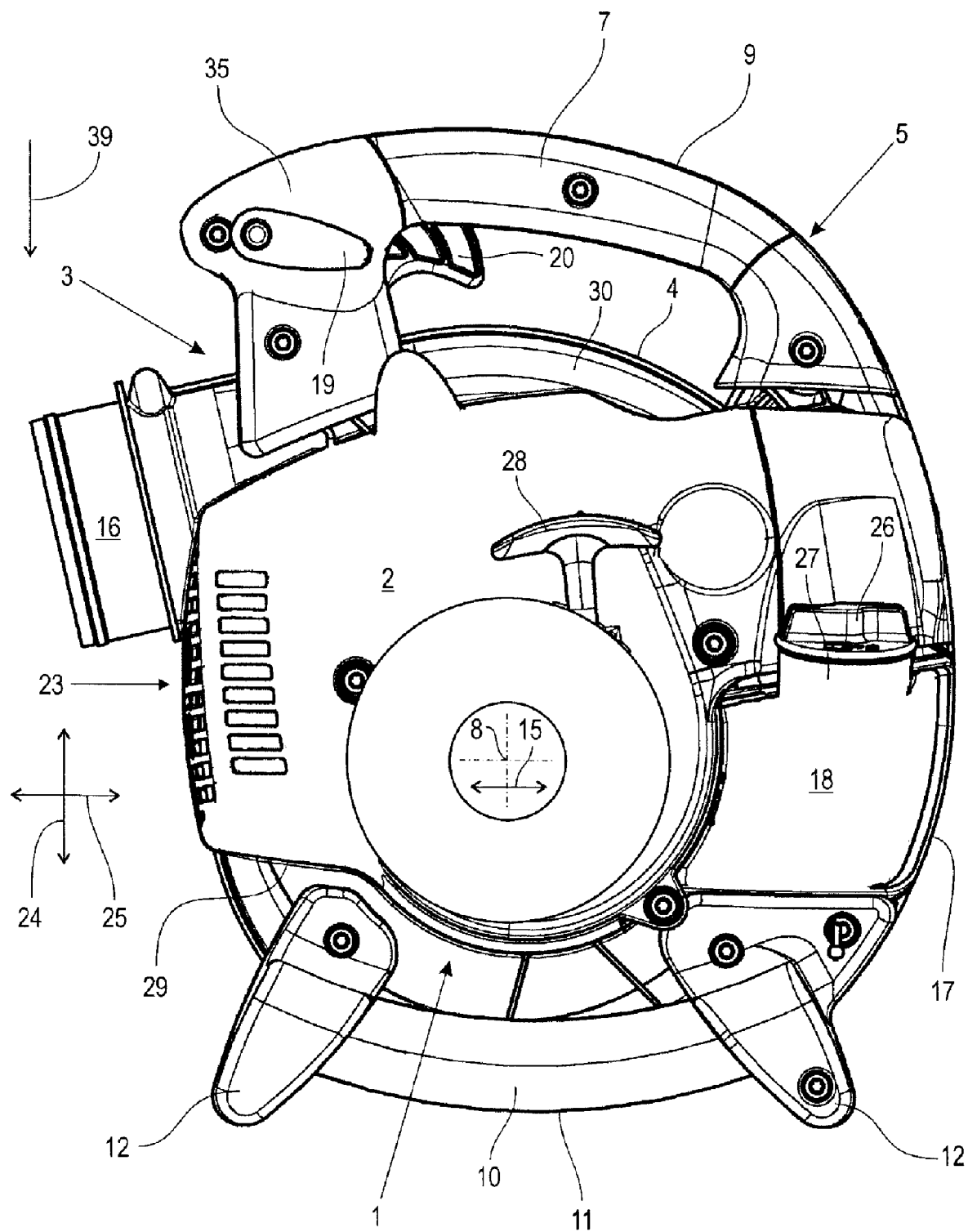

The hand-guided portable vacuum/blower device according to FIG. 1 has a motor unit 1, a blower unit 3, and a grip part 5. A drive motor 2, not shown in detail, is arranged within the motor housing 29 of the motor unit 1. A blower 4 is arranged in the blower unit 3; in the illustrated side view only a section of the blower spiral 30 of the blower 4 is shown. The blower spiral 30 opens into the discharge socket 16. The blower unit 3 is fixedly connected to the motor unit 1 and forms together with it a mechanically essentially rigid or stiff module.

In the illustrated embodiment, the drive motor 2 is a two-stroke internal combustion engine; a pull cable starter 28 is provided for starting it. It is also possible to employ a four-stroke motor or an electric motor. The drive motor 2 is provided for driving the blower 4 that, in operation of the drive motor 2, conveys an air flow through the blower spiral 30 and the discharge socket 16. The blower 4 in the illustrated embodiment is a radial blower. It can also be expedient to provide an axial blower configuration or a similar design.

In the driven state, a blower wheel (not illustrated) of the blower 4 rotates about an axis of rotation 8 that defines a lateral orientation of the vacuum/blower device. Perpendicularly to the axis of rotation 8 and the thus defined lateral orientation, a vertical direction in accordance with the double arrow 24 and a longitudinal direction in accordance with double arrow 25 are defined as a coordinate system fixed relative to the body.

Figure 2:
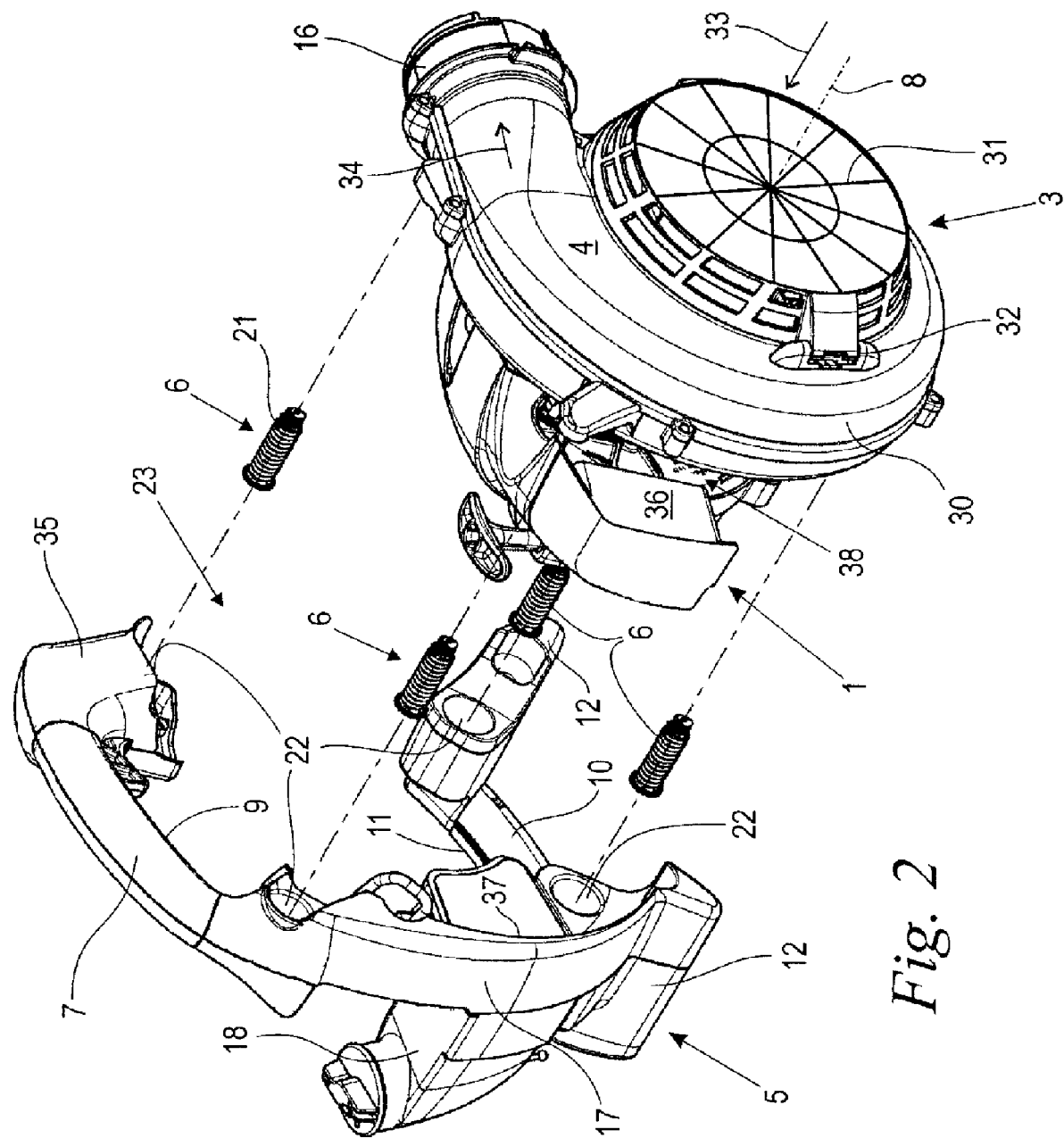
FIG. 2 is an exploded view of the vacuum/blower device according to FIG. 1 showing details of the arrangement of antivibration elements and the attachment of the grip part realized therewith.

On the rigid module comprised of motor unit 1 and blower unit 3, the grip part 5 is attached by means of antivibration elements 6 illustrated in FIG. 2. The grip part 5 is approximately ring-shaped. It can be configured as a closed ring; preferably, it is essentially C-shaped as in the embodiment according to FIG. 1. For forming this C-shape, a first ring section 9 positioned in the vertical direction 24 at the top, an opposed bottom ring section 11, as well as an intermediate central section 17 are provided. The first ring section 9 is positioned relative to the vertical direction 24 above the axis of rotation 8, the second ring section 11 below the axis of rotation 8, and the central section 17 to the rear relative to the axis of rotation 8 and relative to the discharge socket 16.

The vacuum/blower device according to FIG. 1 has a spatial orientation relative to the weight force direction indicated by arrow 39 that is designed for the usual blower operation. The center of gravity positioned approximately in the area of the axis of rotation 8 of the vacuum/blower device is positioned relative to the weight force direction 39 below the first ring section 9 of the grip part 5. The first ring section 9 forms a first handle 7 for lifting the vacuum/blower device and for guiding it in operation. The position of the center of gravity relative to the first handle 7 has the effect that the vacuum/blower device when lifted and guided is suspended from the first handle 7 without having to generate pivoting or tilting moments at the handle 7. In the illustrated position, the discharge socket 16 is positioned slightly downwardly slanted at a flat angle. By means of a blower tube (not illustrated) coaxially connected thereto, the conveyed airflow can be directed at a flat angle against the ground surface to be cleaned. Leaves or the like can be effectively gathered by blowing.

In the area of the second ring section 11 that is positioned in the vertical direction 24 relative to the axis of rotation 8 opposite to the first ring section 9, two support legs 12 are formed on the grip part 5. The vacuum/blower device can be put down on the support legs 12 in an upright position.

By means of the second ring section 11 a second handle 10 is formed. For vacuum operation, the vacuum/blower device can be tilted by 90 degrees about its longitudinal axis 25 so that the axis of rotation 8 is essentially parallel to the weight force direction 39. In this connection, the vacuum/blower device is held with both hands by gripping the two handles 7,10 with one hand, respectively. Further details for vacuum operation will be explained in connection with FIG. 2.

The side view of FIG. 1 also shows that the C-shaped grip part 5 is arranged relative to the blower unit 3 such that its open side 23 is in the area of the discharge socket 16. In the illustrated side view, the discharge socket 16 extends through the open side 23. A radial direction that extends radial to the axis of rotation 8 and parallel to the longitudinal direction 25 is indicated by the double arrow 15. Relative to the radial direction 15, the central section 17 is positioned opposite the open side 23. The longitudinal axis of the central section 17 extends approximately in the vertical direction 24 while longitudinal axes of the two ring sections 9, 11 extend approximately in the longitudinal direction 25. The two support legs 12 enclose in the longitudinal direction 25 at both ends the second ring section 11 forming the second handle 10. The first ring section 9 that forms the first handle 7 is delimited at the front end relative to the longitudinal direction 25 by the adjoining end member 35. In the end member 35 an operating element 20 is pivotably supported that extends on the bottom side of the first handle 7; in the illustrated embodiment, the operating element 20 is a throttle trigger for the drive motor 2. Laterally positioned relative to the end member 35, a further pivotable operating element 19 is arranged that can be a locking device for the throttle trigger 20 and/or a stop lever for the drive motor 2. The operating elements 19, 20 can also be provided for additional operating functions of the drive motor 2, for example, choke actuation or the like.

In the area of the central section 17, a fuel tank 18 is integrated into the grip part 5. The fuel tank 18 is provided for receiving fuel for the drive motor 2. For filling the tank, a fill socket 27 is provided which is closed by a detachable tank lid 26. The fuel tank 18 as well as the operating elements 19, 20 are connected by means of flexible connections to the motor unit 1. For this purpose, Bowden cables (not illustrated) or rod linkages (not illustrated) for the operating elements 19, 20 can be provided; the fuel supply can be realized by a flexible hose (not illustrated). The flexibility of the connection enables in the context of vibration damping by means of the antivibration elements 6 (FIG. 2) an unimpaired relative movement between the grip part 5 and the component module comprised of motor unit 1 and blower unit 3.

The illustration according to FIG. 1 also shows, at least schematically, that the blower unit 3 with its blower spiral 30 is positioned relative to the direction of the axis of rotation 8 behind the grip part 5 while the motor unit 1 is positioned oppositely in front of the grip part 5. The ring-shaped extension of the grip part 5 is thus positioned in a plane that is defined by the vertical direction 24 and the longitudinal direction 25 and, viewed in the direction of the axis of rotation 8, is located between the motor unit 1 and the blower unit 3.

FIG. 2 shows the blower/vacuum device according to FIG. 1 in a perspective exploded view. It can be seen clearly that the motor unit 1 and the blower unit 3 form their own, rigidly connected component module while a further component module is provided by the grip part 5. There are a total of four antivibration elements 6 by means of which the grip part 5 is connected to the aforementioned component module of motor unit 1 and blower unit 3. Expediently, at least three vibration elements 6 are provided that define a common plane. In the illustrated embodiment of four antivibration elements 6, a rectangle is defined, at least approximately, by the elements 6. The antivibration elements 6 can be rubber (elastic) elements or the like; in the shown embodiment, they are coil springs 21 arranged in axis-parallel arrangement, i.e., the longitudinal axes of the springs 21 are parallel to one another. For each coil spring 21 a cylindrical receiving opening 22 is provided in the grip part 5, respectively; in the mounted state, the coil springs 21 are surrounded with minimal play by the receiving openings 22, respectively.

The perspective illustration of the grip part 5 also shows that the first ring section 9, including the first handle 7 and the end member 35, and the central section 17 are positioned approximately in a common plane. The second ring section 11 with the additional handle 10 is laterally displaced relative thereto as is the fuel tank 18. The two support legs 12 extend in the direction of the axis of rotation 8 across the entire width of the grip part 5. The width of th grip part 5 is only minimally smaller than the width of the component module comprised of motor unit 1 and blower unit 3.

The blower 4 of the blower unit 3 has on its end face opposite the motor unit 1 an intake opening (not illustrated) that is covered by means of an intake screen 31. In operation, an airflow is sucked in through the intake screen 31 in the direction of arrow 33 or in the direction of the axis of rotation 8; a radial intake is possible also. The air flow passes through the blower spiral 30 and is discharged through the discharge socket 16 in the direction of arrow 34. For blower operation, a blower tube (not illustrated) can be pushed onto the discharge socket 16. For vacuum operation, the intake screen 31 can be pivoted into an open position by means of hinge 32. A vacuum tube (not illustrated) is then pushed onto the intake opening (not illustrated); the vacuum tube extends approximately axis-parallel to the axis of rotation 8. In this operating mode, the discharge socket 16 can open into a collecting bag, for example, by means of a hose or suitable tube.

Between an oil tank 36 of the motor unit 1 mounted rearwardly on the motor housing 29 and the rearward part of the blower spiral 30, a gap 38 is formed that defines at least approximately the separation plane between the motor unit 1 and the blower unit 3; this plane also describes, at least approximately, the plane of extension of the C-shaped grip part 5. In the mounted state, the fuel tank 18 is positioned with play underneath the oil tank 36 as well as with lateral play relative to the blower spiral 30. The central section 17 of the grip part 5 is provided on its radial inner side with a curved section 37 that, with regard to its contour, corresponds to the circumferential contour of the blower spiral 30. In the mounted state, the curved section 37 surrounds the blower spiral 30 at radial play wherein the outer side of the central section 17 projects in the radial direction past the contour of the blower spiral 30. The central section 17 extends in the circumferential direction of the grip part 5 in a convexly rounded shape and has also a convexly rounded cross-section. The fuel tank 18 in the circumferential direction of the grip part 5 is matched with its contour to the rounded shape of the central section 17. In the mounted state, the central section 17 and the fuel tank 18 extend in the radial direction 15 (FIG. 1) at least to the circumferential contour of the motor unit 1 (or its motor housing 29 or the oil tank 36) and the blower unit 3. Preferably, they project in the radial direction 15 at least a little bit past the motor unit 1 and the blower unit 3. In vacuum operation in which the axis of rotation 8 is upright and approximately parallel to the weight force orientation 39 (FIG. 1), the vacuum/blower device can be held by gripping both handles 7, 10. The central section 17 forms together with the fuel tank 18 a rounded contact surface for the body of the operator. It can also be expedient to position the central section 17 in the gap 38 and to have the central section 17 extend in the radial direction 15 (FIG. 1) to the circumferential contour of the blower spiral 30; the blower spiral 30 is then also a part of the contact surface.

Figure 3:
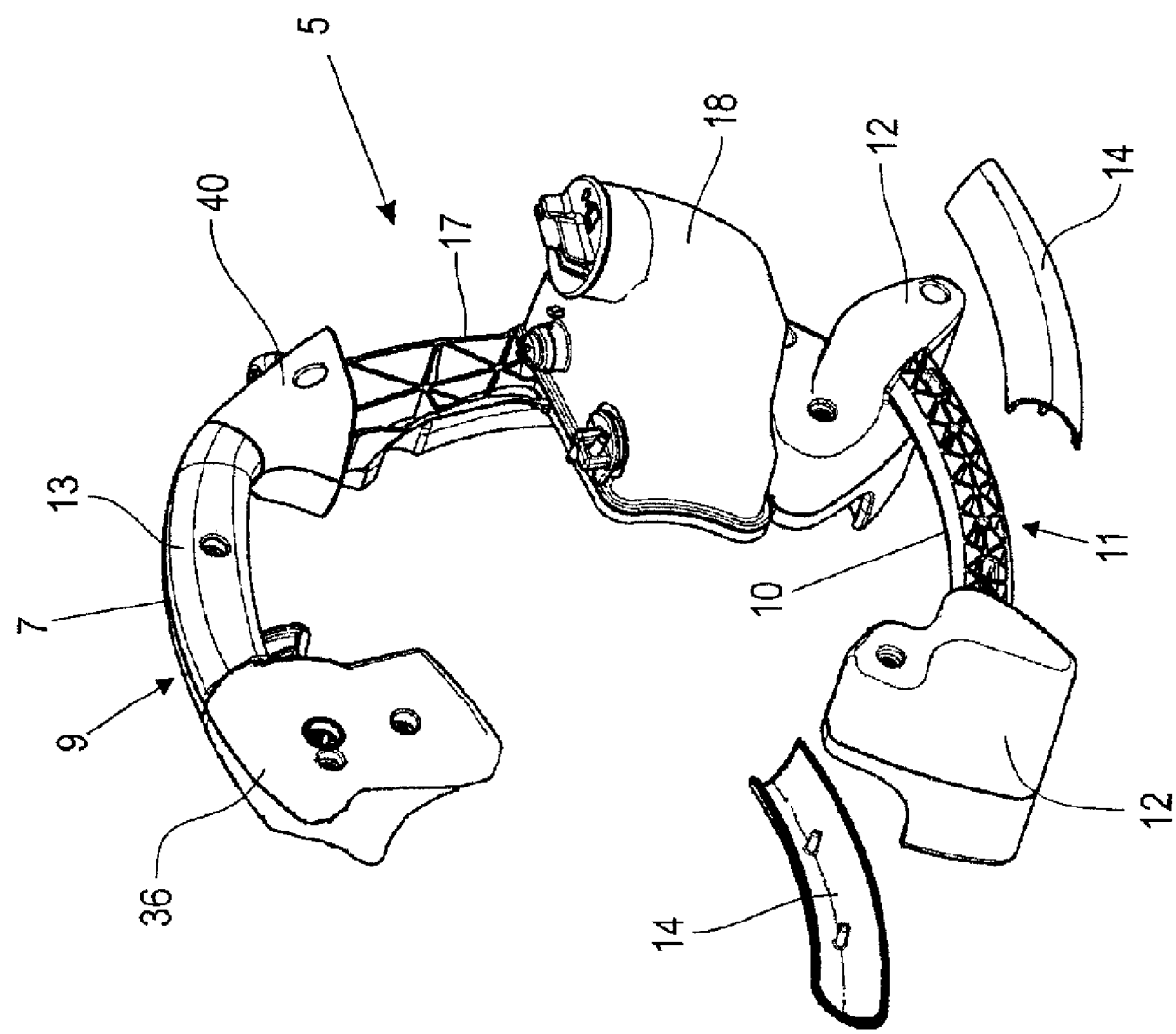
FIG. 3 is a perspective detail view of the grip part according to FIGS. 1 and 2 showing details of the grip shells of the handles and of the fuel tank integrated into the central section.

FIG. 3 shows in a perspective detail illustration the grip part 5 of the vacuum/blower device according to FIGS. 1 and 2. It can be seen that the grip part 5 is comprised of a ribbed, injection-molded plastic structure onto which shell parts are screwed for forming the end member 35, a transition member 40, the intermediately positioned handle 7, the fuel tank 18, the support legs 12, and the intermediately positioned handle 10. Instead of a screw connection, a weld connection or a glue connection of the shell parts can also be expedient. The grip shell for forming the handle 7,10 are shell parts 13, 14 made of soft, grip-enhancing and electrically conducting plastic material and are screwed on opposite sides onto the ring section 9, 11, respectively.

While specific embodiments of the invention have been shown and described in detail to illustrate the inventive principles, it will be understood that the invention may be embodied otherwise without departing from such principles.

What is claimed is:

1. A hand-guided portable vacuum/blower device comprising:
   a blower unit comprising a blower that has an axis of rotation;
   a motor unit comprising a drive motor;
   wherein the blower unit is rigidly connected to the motor unit;
   wherein the drive motor is drivingly connected to the blower;
   a grip part connected with antivibration elements to the motor unit and the blower unit, wherein the vacuum/blower device in an upright position has a vertical direction that is perpendicular to the axis of rotation;
   wherein the grip part is at least approximately ring-shaped and has a first handle, wherein the grip part comprises a first ring section positioned in the vertical direction above the axis of rotation, a second ring section positioned opposite the first ring section and below the axis of rotation relative to the vertical axis, and an intermediate central section arranged between the first and second ring sections;
   wherein the grip part is arranged in a plane which plane is positioned perpendicularly to the axis of rotation and, when viewed in the direction of the axis of rotation, is located between the motor unit and the blower unit;
   a fuel tank integrated into the central section.

2. The vacuum/blower device according to claim 1, wherein the grip part has a second handle and wherein the first handle is arranged on the first ring section and the second handle is arranged on the second ring section.

3. The vacuum/blower device according to claim 2, wherein the first ring section forms the first handle.

4. The vacuum/blower device according to claim 2, wherein the second ring section forms the second handle.

5. The vacuum/blower device according to claim 2, wherein the first and second ring sections form the first and second handles, respectively.

6. The vacuum/blower device according to claim 2, wherein the second ring section has support legs for resting the vacuum/blower device thereon.

7. The vacuum/blower device according to claim 2, wherein at least one of the first and second handles is provided with a gripping surface that is electrically conducting.

8. The vacuum/blower device according to claim 7, wherein the gripping surface is soft.

9. The vacuum/blower device according to claim 7, wherein the electrically conducting surface is provided by a grip shell attached to the at least one of the first and second handles and comprised of soft, grip-enhancing and electrically conducting plastic material.

10. The vacuum/blower device according to claim 9, wherein the grip shell is comprised of two opposed shell parts.

11. The vacuum/blower device according to claim 1, wherein the central section is positioned opposite a discharge socket of the blower, wherein the central section has a substantially convexly rounded circumferential contour in a radial direction relative to the axis of rotation.

12. The vacuum/blower device according to claim 11, wherein the central section has a substantially convexly rounded cross-section in the radial direction.

13. The vacuum/blower device according to claim 11, wherein the central section extends in the radial direction at least to an outer contour of the motor unit and an outer contour of the blower unit.

14. The vacuum/blower device according to claim 13, wherein the central section extends in the radial direction past the outer contour of the motor unit and the outer contour of the blower unit.

15. The vacuum/blower device according to claim 1, further comprising an operating element for the drive motor, wherein the operating element is connected to the grip part.

16. The vacuum/blower device according to claim 15, wherein the operating element is connected to the first handle.

17. The vacuum/blower device according to claim 1, wherein at least three of the antivibration elements are provided.

18. The vacuum/blower device according to claim 1, wherein the antivibration elements are coil springs.

19. The vacuum/blower device according to claim 18, wherein the coil springs are arranged such that longitudinal axes of the coil springs are parallel to one another.

20. A hand-guided portable vacuum/blower device, comprising:
   a blower unit comprising a blower;
   a motor unit comprising a drive motor;
   wherein the blower unit is rigidly connected to the motor unit;
   wherein the drive motor is drivingly connected to the blower;
   a grip part connected with antivibration elements to the motor unit and the blower unit;
   wherein the grip part has a first handle;
   wherein the grip part is arranged in a plane which plane is positioned perpendicularly to an axis of rotation of the blower and, when viewed in the direction of the axis of rotation, is located between the motor unit and the blower unit;
   wherein the grip part has essentially a C-shape that comprises a first ring section positioned in the vertical direction above the axis of rotation, a second ring section positioned opposite the first ring section and below the axis of rotation relative to the vertical axis, and an intermediate central section arranged between the first and second ring sections; and
   wherein an open side of the C-shape opposite the intermediate central section is arranged at a location where a discharge socket of the blower is arranged.

21. The vacuum/blower device according to claim 20, further comprising a fuel tank connected to a central section of the grip part.

* * * * *